United States Patent [19]

Dickson et al.

[11] Patent Number: 5,179,778
[45] Date of Patent: Jan. 19, 1993

[54] METHOD AND MEANS FOR PRODUCING DISKS OF TIGHTLY PACKED ON-END ALIGNED FIBERS

[76] Inventors: Lawrence J. Dickson, 558 Cedar Run Rd., Newark; Donald L. Blake, 4489 Newton Rd., NE, Newark, both of Ohio 43055

[21] Appl. No.: 842,029

[22] Filed: Feb. 25, 1992

[51] Int. Cl.⁵ .................... H01R 43/20; B23P 23/04
[52] U.S. Cl. ................... 29/876; 29/33 F; 29/419.1; 29/517; 29/520; 29/728; 29/745; 29/826
[58] Field of Search ............. 29/872, 826, 520, 419.1, 29/517, 745, 33 F, 728

[56] References Cited

U.S. PATENT DOCUMENTS

| | | | |
|---|---|---|---|
| 3,204,326 | 9/1965 | Granitsas | 29/419.1 X |
| 3,510,934 | 5/1970 | Koelichen | 29/419.1 |
| 3,540,114 | 11/1970 | Roberts et al. | 29/419.1 |
| 3,889,348 | 6/1975 | Lennelson | 29/419.1 |
| 4,261,099 | 4/1981 | Gainer, Jr. | 29/872 |
| 4,715,105 | 12/1987 | Beaver | 29/419.1 |

Primary Examiner—Carl J. Arbes
Attorney, Agent, or Firm—Charles F. Schroeder

[57] ABSTRACT

A method and means for producing disks of tightly packed on-end aligned fibers wherein side-by-side filament tows are surrounded and pulled by a Chinese-finger type gripper sleeve which tightens about the tows and compacts the filaments as it is pulled. The gripper sleeve and filament assembly is further compacted by being pulled through a draw-down die and into a tube surrounded by a backup casing. The highly compacted mass of filaments with the surrounding portion of the sleeve within the tube are cut free from the external portion of the portion of the puller sleeve and the loaded tube is removed from the casing. A plurality of disks of predetermined thickness containing the desired highly compacted on-end aligned fibers are then formed by cross-sectionally cutting the filament loaded tube segment by segment.

21 Claims, 2 Drawing Sheets

METHOD AND MEANS FOR PRODUCING DISKS OF TIGHTLY PACKED ON-END ALIGNED FIBERS

FIELD OF THE INVENTION

This invention is a method and means for producing disks of tightly packed on-end aligned fine fibers of electrically conductive material adaptable to cloud-like dispersion for disruption of beams of electromagnetic radiation.

BACKGROUND AND PROBLEM

A well established technique of disruption of a beam of shortwave radiation directed to detect and lock onto a distant target is to disperse chaff of electrically conductive particles within the vicinity of the target to disrupt the normal response of such beams. One approach is to disperse chaff of short length electrically conductive fibers such as carbon fibers, metal such as steel fibers or metal coated glass fibers and the like in the path of radiation beams. According to the present invention it is desired to provide a high concentration of conductive short length fibers in tightly packed unbonded on-end relation within a small disk adapted to being burst to widely disperse the electrically conductive fibers for disruption of shortwave energy, such as microwave beam responses.

An object of the invention is to provide a method and means for tightly packing a mass of electrically conductive fibers of short length in on-end relation within a disk adapted to insertion in a cartridge which is designed to explosively discharge the contained disk for dispersion of the conductive fibers.

A problem presented in producing such a disk is how to compact a mass of short length fibers to a desired high density in aligned on-end relation within a surrounding shell of prescribed diameter and depth dimension.

Another problem confronted is how to provide a central opening in the mass of on-end aligned fibers of the disk for placement therein of a bursting force means for dispersion of the fibers. In other words, the disk is desired to be annular in form with the on-end aligned fibers packed to a high density between the inner and outer diameters of the annulus.

An object of the invention is to provide an efficient method and means for tightly packing a mass of conductive fibers of short length in on-end relation within an annular disk.

Another and more specific object of the invention is to provide a novel method and means for producing an annular disk of tightly packed electrically conductive fibers of specified length held together in their packed relation by an annular ring which when burst will provide the mass of fibers in disassociated dispersed relation as a cloud of fine conductive fibers for disrupting the normal responses of beams of electromagnetic radiation directed toward a target.

SOLUTION

According to the present invention it has been found that by pulling a multiplicity of tows of fine filaments of desired conductive material into an elongate tube with a surrounding braided Chinese finger-type pulling gripper sleeve, the mass of filaments in the tows can be compacted to a high degree while being pulled. Further it has been found that such mass of filaments can be desirably compacted to a still higher degree during pulling into the tube by drawing the gripper sleeve or sock and the mass of filaments contained therein through a draw-down die positioned in advance of the tube. A strength imparting casing of suitable material such as steel is provided in surrounding relation with the tube during the pulling step to provide backup strength for the tube which is usually of nonconductive material such as of synthetic resin. The longitudinal tube with the thus installed compacted conductive filaments aligned longitudinally therein surrounded by the braided material of the pulling sleeve can then be removed from the casing and sawed segment by segment to produce the desired disks of prescribed depth dimension.

Where a central aperture is desired in the disk thus fabricated, a small ring of desired diameter for the central aperture can be pushed into the center of the disk with a punch type die arranged to remove the central fibers and insert the ring into the desired central position. The outer and central rings of the disk can be made of the same preferably nonconductive material.

The braided or woven pulling sleeve with which the conductive fibers are pulled remain passively within the interior periphery of the outer wall of the disk in surrounding relation about the fibers in each disk. The braided pulling sleeve can be made of filaments of any number of high tensile strength materials such as carbon, glass, Nomex, Kevlar, and Teflon. (Kevlar, Nomex and Teflon are registered trademarks for materials sold by the DuPont Company of Wilmington, Del.) Because of their economy and high strength, glass filament gripping sleeves are preferred, but where additional conductive fibers are desired in the disks the pulling sleeve can be of conductive filaments such as of carbon.

A feature of the invention lies in the high degree of compaction of filaments possible with the apparatus and technique of fabrication utilized as well as the relative ease with which disks of any number of depth dimensions desired to provide short length conductive fibers matched to produce the electromagnetic radiation disruption characteristics desired.

Another feature of the invention is the accuracy with which a central opening can be provided in each disk for retention of means for exerting a bursting force uniformly within the disk to disperse the fibers contained therein as a cloud of the conductive fibers.

Other objects and features which are believed to be characteristic of our invention are set forth with particularity in the appended claims. Our invention, however, both in organization and manner of construction, together with further objects and features thereof, may be best understood by reference to the following description taken in connection with the accompanying drawings.

Figure 1:
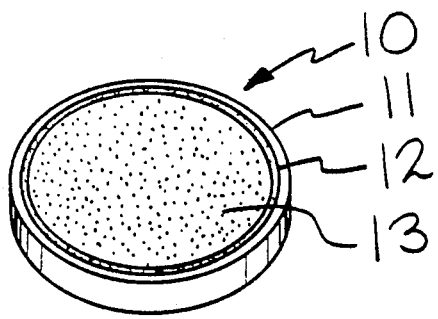
FIG. 1 is an illustration in perspective of a disk containing compacted on-end aligned fibers produced according to the method and apparatus of the present invention.
Figure 3:
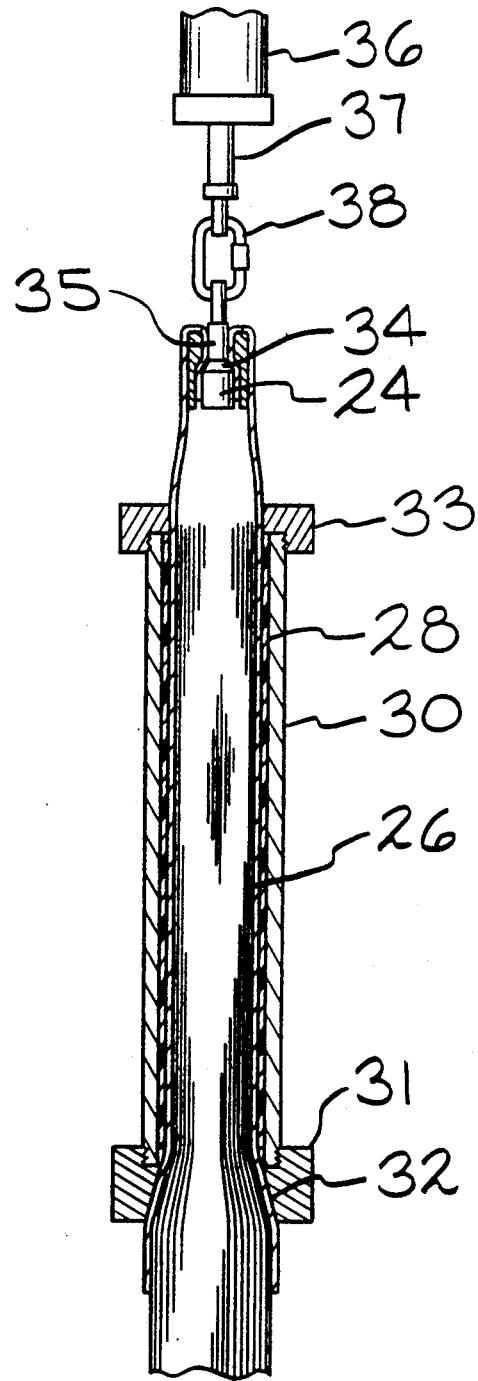
FIG. 3 is a side elevational view partially in cross section showing the pulling sleeve arrangement of FIG.
Figure 4:
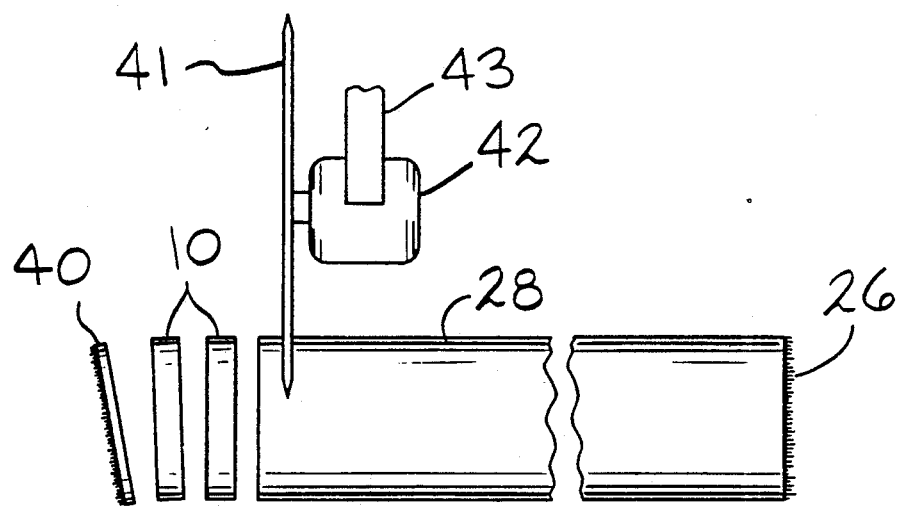
Figure 5:
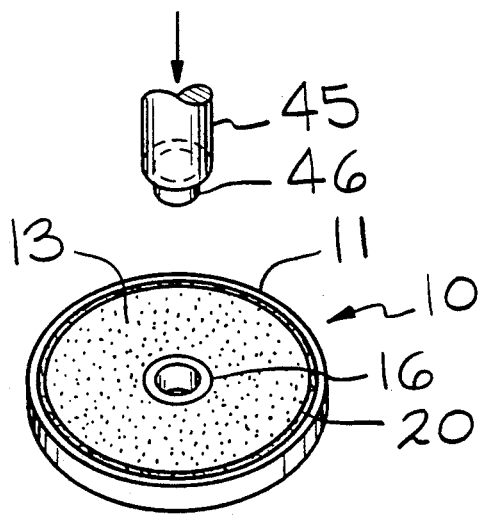
Figure 6:
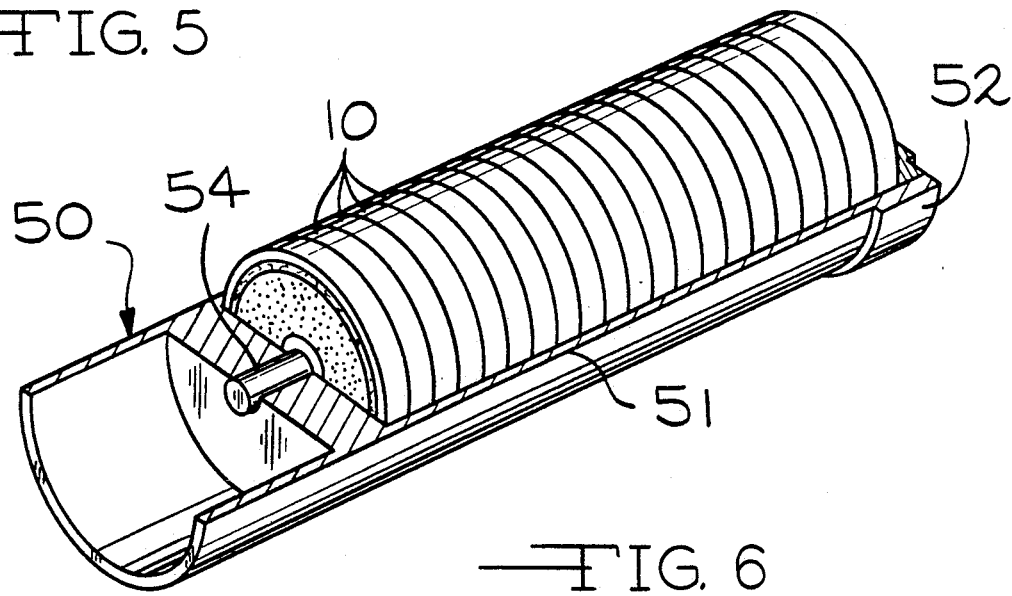

2 pulling the mass of continuous filaments contained therein into a tube held within a casing die;

FIG. 4 is a schematic side elevational view of a mechanism for slicing disks from the end of a tube containing continuous compacted filaments made in the arrangement of FIG. 3;

FIG. 5 is a view in perspective of a disk like that of FIG. 1 with a central aperture provided therein by pushing in a central ring into the disk; and FIG. 6 is a schematic broken away illustration of a fiber dispersing assembly in which a plurality of the disks like those of FIG. 5 are stacked for discharge when desired to produce a cloud of radiation beam disrupting conductive elements.

DETAILED DESCRIPTION

FIG. 1 illustrates a disk 10 made with the apparatus according to the method of the present invention wherein on-end aligned electrically conductive fibers 13 are held tightly compacted by an outer ring 11 aligned on the interior periphery thereof with fibers 12 which remain from the pulling sleeve responsible for compacting the fibers 13 into their dense on-end aligned relation. The outer retaining ring 11 may be in the order of 2½ inches in diameter and have in the order of 48 to 50 million fibers 13 held therein without binder by the outer retaining ring 11 which is preferably of plastic material or reinforced plastic such as linen/phenolic, polycarbonate, glass/epoxy or paper/phenolic material.

Figure 2:
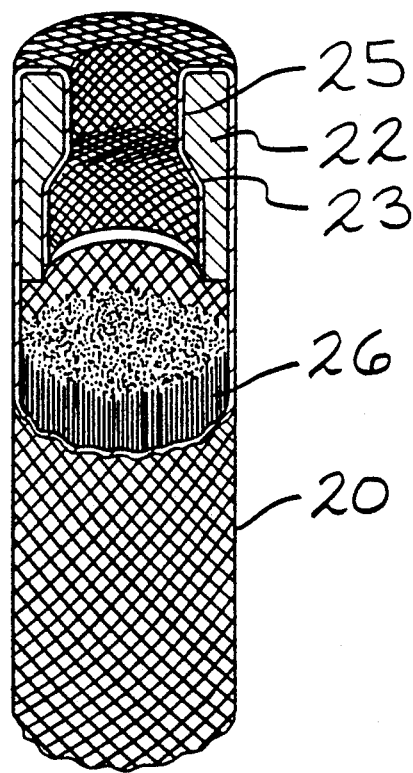
FIG. 2 is a broken away side elevational view of a Chinese finger-type pulling gripper surrounding a mass of continuous filaments and having its pulling end folded over a pulling die.

FIG. 2 illustrates how carbon filaments 26 in the form of a number of side-by-side tows are aligned in side-by-side relation within a braided pulling sleeve 20 of Chinese finger type which draw the carbon filaments together upon being pulled. As illustrated in FIG. 3, the braided pulling sleeve at its pulling end is folded over a female annular retaining collar 22 of a male pulling die 24. The folded over portion 25 of the pulling sleeve 20 extends over the interior surface of the retaining collar 22 and over a shoulder 23 shaped in dimension for mated relation with the male pulling die 24 having a shoulder 34 which is arranged to engage the retaining die shoulder 23 and to hold the fold-over portion 25 of the pulling sleeve 20 in clamped relation as the pulling die 24 is drawn upwardly into the retaining collar 22.

FIG. 3 illustrates the overall arrangement by which the pulling die 24 is drawn upwardly into the retaining collar 22 by way of its stem 35 by a puller 36 such as a pneumatic, electrical or hydraulic puller having a pulling shaft 37 connected to the pulling stem 35 by a removable link 38. The braided pulling sleeve 20 with the multitude of continuous filaments 26 contained therein is drawn with a constant non rupturing force for example of about 4,000 pounds into a tubular shell 28. The tube 28 is usually of nonmetallic material, which is installed and held in backed up relation by a steel casing 30 mounted in a fixed position which backs up the shell 28 held in snug fit relation therein. The assembly of filaments 26 and surrounding sleeve 20 are thus progressively urged into the tube 28 with a force adequate to advance the sleeve and contained filaments without rupturing the assembly. An annular tube-retaining end cap 33 is held in screw threaded relation with the upper end of the casing 30. The annular retaining cap can be dimensioned so that its interior opening is such that the braided sleeve and pulling die can be drawn upwardly therethrough while a shoulder portion of the cap extends over the inner diameter of the casing 30 to hold the tubular shell 28 in fixed position as the pulling sleeve 20 with the filaments 26 contained therein are drawn into the tube 28. The backup casing 30 extends over the full length of the tube 28 and provides at its opposite end a draw-down die 31 having a tapered entrance 32 which constricts the sleeve 20 and the filaments 26 to a much greater density than tension on the sleeve 20 alone would accomplish.

In overall the braided pulling sleeve is longer than the mass of filaments to be compressed in order to allow the fold over of the end of the sleeve into the pulling die. The smallest interior dimension of the draw-down die 31 is matched to the interior dimension of the tube 28 which is of diameter such as to compress the filaments to the compaction necessary for the density desired to meet specifications. A lubricant such as Teflon spray is applied to the surface of the sleeve 20 to reduce the friction and possible abrasive action of the interior surface of the draw-down die 31 and the interior surface of the tube 28. (Teflon is a Trademark for a lubricant material commercially sold by The DuPont Company, Wilmington, Del.) The assembly for the pulling die 24 is pulled through the tube 28 with the braided sleeve 20 attached thereto to a position where the filaments 26 extend for the full length of the interior of the tube 28 whereupon the empty end of the sleeve above the tube retaining cap 33 is severed to separate it form the pulling die assembly. The tube and the compacted filaments contained therein can then be removed by unscrewing the draw-down die 31 from the opposite end of the backup casing 30 and by sliding the tube end fibers from the entry end of the casing. The excess length of fibers and the braided sleeve portions extending from the opposite ends of the tube can then be cut away to present a fully loaded tube of highly compacted substantially continuous length conductive filaments extending therethrough in aligned side-by-side substantially parallel relation.

As illustrated in FIG. 4, the filament loaded tube 28 can be cut in segments by a saw 41 driven by a motor 42 positionably mounted on a drive mount 43. The rotary saw is used to first cut off a thin end blank 40 having fiber ends projecting therefrom thereby providing a smooth surface end. The tube is thereafter crosscut in segments of depth corresponding to the thickness of the disks desired. Such depth might be in the order of one-quarter inch or any of a range of depths desired to produce the length of fibers ultimately to be dispersed therefrom. Disks 10 of desired depth can be cut serially from the tube 28 until it is fully consumed.

FIG. 5 illustrates how a disk 10 can be provided with a central aperture defined by an inner ring 16 surrounded by on-end aligned fibers 13 held thereon in tightly compacted high density relation by the outer shell 11. The inner ring 16 is inserted by a punch or pushing die 45 having a circular end 46 which matches the interior dimension of the inner ring 16. A ring 16 can be placed on the end of the punching die 45 in surrounding relation with the punch end 46 and pushed into the center of the disk 10 while it rests in a suitable jig allowing removal of the central fibers from below. Upon removal of the punching die 45 the inner ring 16 then remains in place where inserted.

FIG. 6 illustrates an assembly 50 within which the disks 10 can be stacked in side-by-side relation with a burster rod 54 extending through the center of the aligned disks in the cartridge to provide means for an explosive destruction of the disk. Accordingly a cloud of short length fine conductive fibers are provided into the surrounding atmosphere. An end cap 52 for the cartridge 50 provides a means for insertion of the disks 10 in their side-by-side aligned relation in the cartridge.

By way of example of dimensions of components for fabrication of the filament loaded tube 28, the casing 30 can be made of steel and be in the order of 4 feet long corresponding to the length of the tube 28. The tube 28 can be of linen reinforced phenolic material having a dimension corresponding to the diameter of the disks to be produced which might be in the order of 2 to 2½ inches in diameter. For some purposes, such as for structural or electrical adaptation, the tube may be metal such as steel or brass. Still further the tube may have any of a number of cross sectional shapes other than circular such as square, oval or triangular.

The draw-down die at the entry to the casing 30 can also be of steel, preferably coated with a material such as zinc. The braided pulling sleeve 20 is specified to be longer than the length of the casing 30 assembled with its end caps. In this respect the sleeve length can be in the order of 5½ feet long with a nominal diameter in the range of 2 to 4 inches. The diameter of the fibers in the assembled tows is 4 to 5 microns and each tow contains about 12,000 filaments while the assembly of tows pulled into the tube 28 numbers about 3800. Thus over 45 million filaments can be drawn into the tube 28 to produce disks with an equal number of on-end aligned fibers.

The density of the fibers is preferably a minimum 1.25 grams per cubic centimeter when the fibers are of carbon on a disk substantially ¼ inch thick. The density is determined by the fiber material and thickness of the disk and is established by whether the fibers will fall apart from the assembly when the disk is cut from the filament loaded tube. The more dense the fiber assembly, the thinner the disks can be. Correspondingly the shorter the fibers will be and the higher the frequency response can be when conductive material is used to fill the disks.

Although the invention is described herein in relation to the fabrication of disks from which conductive fibers can be dispersed to disrupt electromagnetic radiation beams, it will be recognized by those skilled in the art that such disks may have other uses because of the particular novel on-end orientation of the fibers therein. In this respect the fibers may be of nonconductive material such as glass fibers or combinations of conductive and nonconductive fibers. By way of example one such use is for shock absorption devices because of the high compressive strength properties imparted to the disk by reason of the on-end orientation of the contained closely compacted fibers. Similarly, a tube of densely packed filaments, both when interbonded or not, will provide a columnar strenght as well as shear strength for structural uses. Because of the electrical conductivity of filaments, such as of carbon, packed into the tube, it has capabilities for electrical uses such as antennas. Still further, since the filaments of the tube and fibers of the disks are so densely packed, the tubes and disks can perform excellently as fluid filtering components such as for air, water or oil filters.

In view of the foregoing it will be understood that many variations of the arrangement of our invention can be provided within the broad scope of principles embodied therein. Thus, while a particular preferred embodiment of our invention has been shown and described, it is intended by the appended claims to cover all such modifications which fall within the true spirit and scope of the invention.

We claim:

1. The method of producing a tube containing a densely compact mass of side-by-side filaments adaptable to being cut cross-wise into disks comprising
   surrounding a multiplicity loosely grouped side-by-side filaments with a gripping sleeve of type which under tension tightens about and compacts said filaments,
   tensioning said gripping means by pulling the assembly of said sleeve and surrounded multiplicity of filaments tightly into a tube of less internal cross sectional dimension than said loose assembly,
   applying a continuous nonrupturing pulling force to said assembly adequate to progressively slide said assembly into one end of said tube, and
   removing loose sleeve portions and filaments from opposite ends of said tube of contained compacted filaments.

2. The method of claim 1 wherein said assembly is pulled through a draw-down die directly in advance of their entrance into said tube,
   said draw-down die acting to progressively reduce the dimension of said assembly to the internal diameter of the tube.

3. The method of claim 2 wherein a strength imparting back-up casing is provided for said tube while said sleeve and filaments contained therein are drawn into said tube.

4. The method of claim 3 wherein a suitable lubricant is applied to said sleeve in advance of entrance of said assembly into the draw-down die.

5. The method of claim 4 wherein said tube and contained densely compacted assembly is cut crosswise serially to form a plurality of disks of predetermined desired depth containing densely packed fibers of said filament material.

6. The method of claim 5 wherein the central fibers in each of said disks is pushed from the disk and replaced by a ring of depth corresponding to that of the disk.

7. The method of providing a mass of densely packed filaments in an elongate tube comprising
   placing a mass of said filaments in side-by-side relation in a pulling gripper sleeve,
   said sleeve being of a type which constricts in cross-sectional dimension upon being pulled to an elongated condition and which in untensioned condition has a length and cross-sectional dimension greater than said tube,
   providing a strength imparting backup casing for said tube,
   pulling one end of the sleeve with the filaments therein through a draw-down die directly in advance of said tube-containing casing,
   said die having as its exit dimension a diameter substantially equal to the inner diameter of said tube,
   pulling said sleeve and contained filaments from said draw-down die directly into said tube in extended relation for its full length,
   severing said sleeve from its pulling means, and
   cutting said tube cross-wise to provide smooth faced exposed ends of compactly held fibers formed of said filaments which fibers are held in unbonded relation by the wall of said tube.

8. The method of claim 7 wherein the tube and filaments contained therein are cut crosswise into disks of predetermined desired depth each containing a portion of the length of said filaments as densely packed on-end aligned fibers of desired length.

9. The method of claim 8 wherein the filaments are of electrically conductive material.

10. The method of claim 9 wherein the filaments are of carbon.

11. The method of claim 10 wherein the material of which said braided sleeve is made are filaments of glass.

12. The method of claim 10 wherein the material of which the braided sleeve is made are filaments of carbon.

13. Apparatus for fabricating a tube containing a compacted mass of side-by-side aligned filaments comprising an elongate tube for receipt of filaments therein, a strength imparting backup casing with open ends shaped to hold said tube in fixed position, an annular draw-down die at one end of said casing through which filaments are to be drawn into said tube, said die having a tapered annular opening therethrough with its smaller dimension substantially matched to the interior diameter of said tube, a mass of continuous filaments for insertion in side-by-side relation in said tube, a braided pulling sleeve for surrounding said filaments which is of type which constricts in dimension upon being pulled to an elongate condition, pulling means for exerting a pulling force on one end of said pulling sleeve with said filaments contained therein into said tube through said draw-down die, said pulling sleeve and contained filaments being pulled into a position in said tube where said filaments and sleeve portion therein extend through the entire length of said tube, means for severing said sleeve from said pulling means to permit removal of said tube and contained filaments from said casing to provide a tube of highly intensified unbonded filaments aligned in side-by-side relation therein.

14. The apparatus of claim 13 including means for serially cutting said tube and contained filaments crosswise to form a plurality of disks comprising short lengths of said filaments as fibers in aligned on-end relation held by a corresponding short length of said tube providing the outer shell of said disk.

15. The apparatus of claim 14 wherein the portion of said braided pulling sleeve within said disk remains on the interior periphery of said shell.

16. The apparatus of claim 15 wherein said mass of filaments are of electrically conductive material.

17. The apparatus of claim 16 wherein the mass of filaments are made of carbon.

18. The apparatus of claim 17 wherein the braided sleeve is made of filaments of glass.

19. The apparatus of claim 17 wherein the braided sleeve is made of carbon filaments.

20. The apparatus of claim 14 wherein the filaments of said mass each have a diameter in the range of 3 to 6 microns.

21. The apparatus of claim 20 wherein the disks have fibers compacted therein to a density of at least 1.25 grams per cubic centimeter.

* * * * *